United States Patent
Bach et al.

(10) Patent No.: US 8,436,738 B2
(45) Date of Patent: May 7, 2013

(54) METHOD AND APPARATUS FOR APPLIANCE GAS LEAK DETECTION

(75) Inventors: James Carter Bach, Seymour, IN (US); Paul Bryan Cadima, Prospect, KY (US)

(73) Assignee: General Electric Company, Schenectady, NY (US)

(*) Notice: Subject to any disclaimer, the term of this patent is extended or adjusted under 35 U.S.C. 154(b) by 374 days.

(21) Appl. No.: 12/938,670

(22) Filed: Nov. 3, 2010

(65) Prior Publication Data
US 2012/0105236 A1    May 3, 2012

(51) Int. Cl.
*G08B 21/00*    (2006.01)
(52) U.S. Cl.
USPC ...... 340/605; 340/521; 340/506; 340/870.02; 340/870.07; 73/40; 73/49.1; 73/49.4; 126/52; 126/39 BA; 126/39 C; 126/39 E
(58) Field of Classification Search ............... 340/605, 340/521, 506, 870.02, 870.07; 73/40, 49.1, 73/49.4; 126/52, 39 BA, 39 C, 39 E
See application file for complete search history.

(56) References Cited

U.S. PATENT DOCUMENTS
7,987,698 B2 * 8/2011 Nakano et al. ............. 73/40.5 R
8,305,231 B2 * 11/2012 Fujii et al. ................ 340/870.02

FOREIGN PATENT DOCUMENTS
GB    2403530    1/2005

\* cited by examiner

*Primary Examiner* — Tai T Nguyen
(74) *Attorney, Agent, or Firm* — Dority & Manning, P.A.

(57) ABSTRACT

A method and apparatus for determining whether an appliance is leaking gas is provided. Pressure measurements are taken after closing off the flow of gas to the appliance and within the appliance so as to isolate the gas within the distribution system of the appliance. If unacceptable changes in the pressure of the gas are detected, a warning signal can be provided and the flow of gas into the appliance can be maintained in an off state until further corrective steps are undertaken. Corrections for temperatures changes between pressure measurements can also be provided.

18 Claims, 4 Drawing Sheets

METHOD AND APPARATUS FOR APPLIANCE GAS LEAK DETECTION

FIELD OF THE INVENTION

The present invention relates to a gas appliance and more particularly to a method and apparatus for a detecting whether an appliance is leaking gas.

BACKGROUND OF THE INVENTION

Fuels such as propane and natural gas are commonly used in a variety of appliances such as e.g., stoves, ovens, dryers, and water heaters. Typically, such appliances are connected to a gas supply that may have hook-ups available at one or more locations within a dwelling or other structure. To enhance safety, it is desirable to determine whether any such appliance is leaking gas.

Gas detection sensors, i.e. sensors that can determine if a particular gas such as propane or methane is present, are relatively expensive and can significantly increase the cost of an appliance. Furthermore, because propane falls and natural gas rises when released into the air, multiple gas detectors may be required at different positions within the same appliance. Appliances are frequently designed for operation with more than one type of gas fuel, which further increases the complexity and/or number of detectors that may be required for gas detection. Multiple detectors may also be required depending upon the size of the appliance and the distribution of gas therein. Unfortunately, the shelf-life of such detectors is typically much less than the appliance itself such that undesirable replacement costs may also be associated with such sensors.

Suppliers of gaseous fuels typically add a scent or odor for purposes of leak detection. If a person smells the leak, appropriate action can be taken such as closing off the flow of gas into the appliance. However, this method of leak detection is dependent upon a person being present at the time of the leak. Such method is also dependent upon such person having sufficient knowledge of both the identity of such an odor and an appropriate course of action when so detected.

Accordingly, a leak detection system for determining whether an appliance is leaking gas is useful and desirable. A leak detection system that can determine whether an appliance is leaking gas and take corrective action to prevent the further flow of gas into the appliance would be particularly useful. Such a system that can detect a gas leak automatically regardless of whether a person is present to operate the appliance would also be beneficial.

BRIEF DESCRIPTION OF THE INVENTION

Aspects and advantages of the invention will be set forth in part in the following description, or may be obvious from the description, or may be learned through practice of the invention.

In one exemplary aspect of the present invention, a method for detecting a gas leak in an appliance is provided. The appliance has at least one gas burner. The method includes the steps of determining whether gas flow to the gas burner has been terminated, shutting off the flow of gas to the appliance if gas flow to the gas burner has been terminated, measuring the pressure of gas in the appliance after the gas flow to the gas burner has been terminated and at a position upstream from a location in the flow of gas where said step of shutting off occurred; re-measuring the pressure of gas in the appliance at a position upstream from the gas burner while the gas flow to the gas burner remains terminated and at an interval of time after the step of measuring; ascertaining whether the pressure of gas in the appliance is unacceptably decreasing; and providing a notification, available to a user of the appliance, if the pressure of gas in the appliance is unacceptably decreasing.

In another exemplary embodiment of the present invention, a gas leak detection system for an appliance is provided for an appliance having a gas inlet and at least one gas burner. The system includes at least one control valve placed upstream of the gas burner as a position that minimizes the amount of gas in the appliance between the control valve and the gas burner. A gas pressure sensor is placed upstream of the control valve. A shut-off valve is placed upstream of the gas pressure sensor and downstream of the gas inlet to the appliance. The shut-off valve is also placed proximate to the gas inlet at a position that minimizes the amount of gas therebetween. A signal element is provided for signaling a warning regarding a gas leak when detected. A control module is provided and placed into communication with the control valve, the gas pressure sensor, the shut-off valve, and the signal element. The control module is configured for determining, at a preselected time, whether the control valve is in a closed position and, if so, then closing the shut-off valve and monitoring the gas pressure in the appliance as measured by the gas pressure sensor to determine if an unacceptable pressure drop has occurred.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figure, in which.

DETAILED DESCRIPTION OF THE INVENTION

Figure 1:
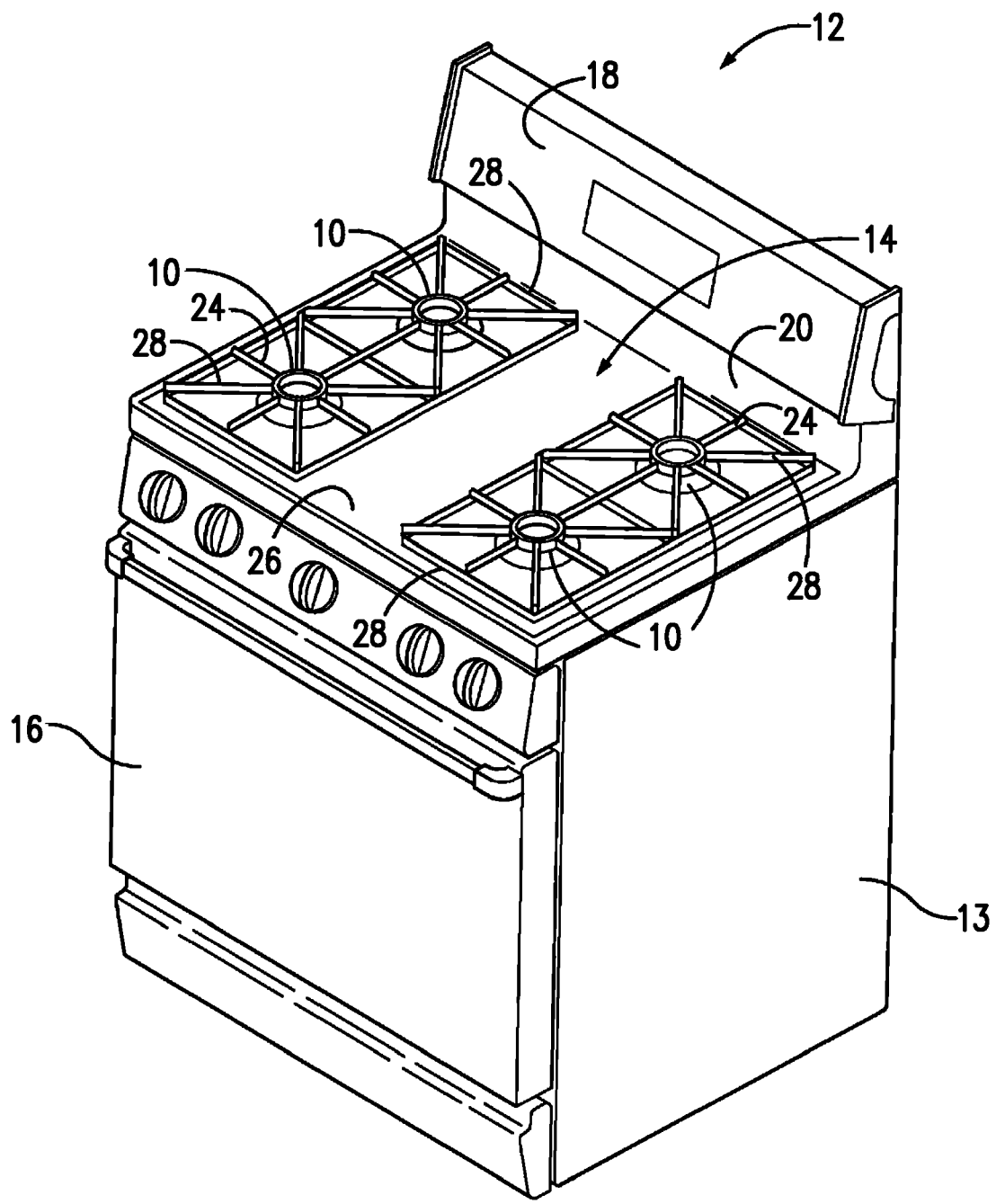
FIG. 1 provides a perspective view of an exemplary embodiment of a gas appliance according to the present invention. While a gas range is depicted, other gas fueled appliances may be used as well.

The present invention provides a method and apparatus for determining whether an appliance is leaking gas. After isolating gas within the gas distribution system/manifold of the appliance, the pressure of the gas is measured intermittently to determine if an unacceptable pressure drop is occurring due to the presence of a leak. In such case, further action can be taken such as signaling the presence of a leak and preventing any additional flow of gas into the appliance. Reference now will be made in detail to embodiments of the invention, one or more examples of which are illustrated in the drawing. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used with another embodiment to yield a still further embodiment. Thus, it is intended that the present invention covers such modifications and variations as come within the scope of the appended claims and their equivalents.

Figure 2:
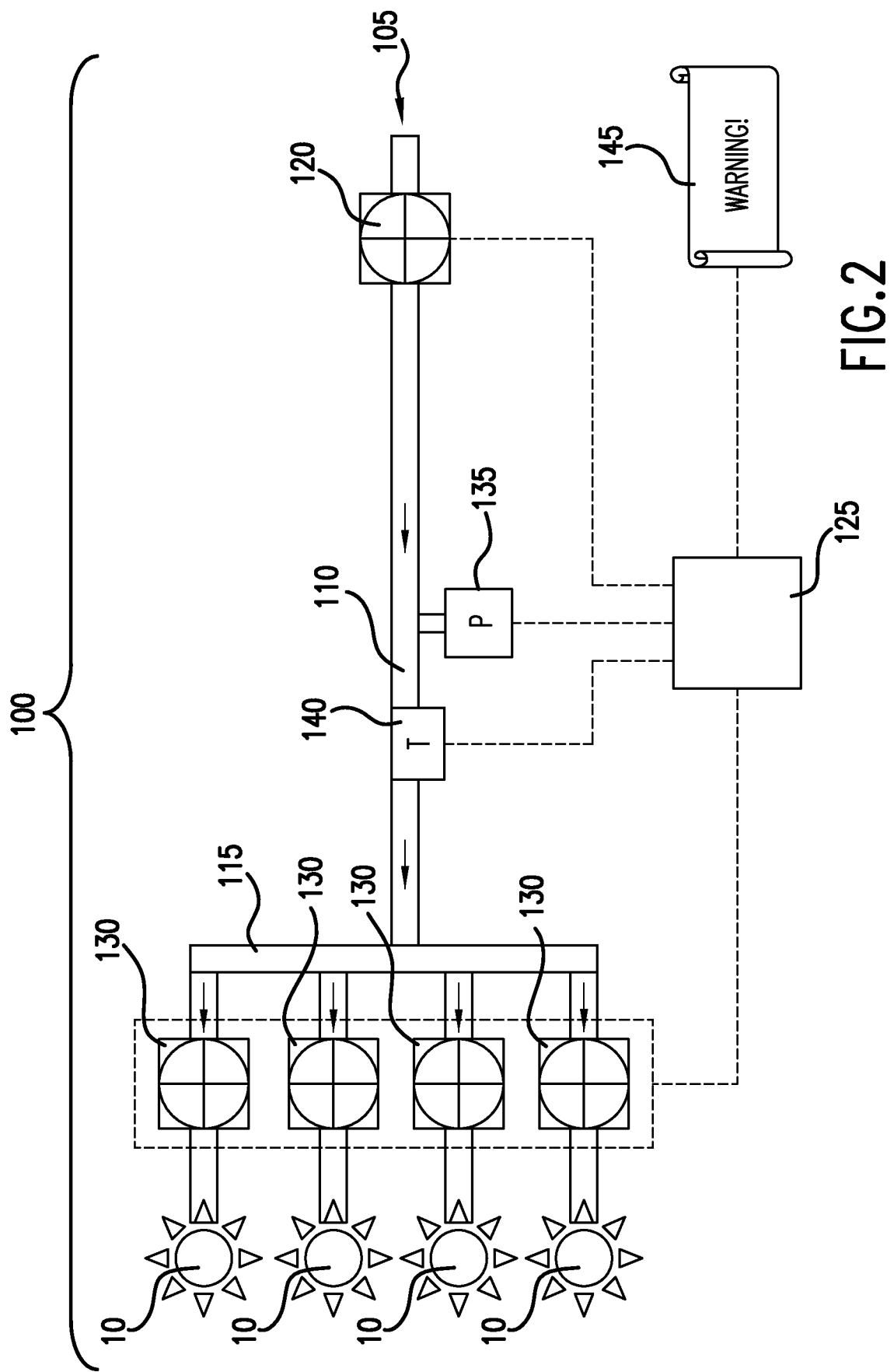
FIG. 2 provides a schematic of an exemplary embodiment of an appliance leak detection system of the present invention.

FIGS. 1 and 2 illustrate a gas distribution system 100 of a gas range appliance 12 that includes an exemplary embodiment of a gas leak detection system according to the present invention. Range 12 includes an outer body or cabinet 13 that incorporates a generally rectangular cook top 14. An oven, not shown in detail, is positioned below cook top 14 and has a front-opening access door 16. A range backsplash 18 extends upward of a rear edge 20 of cook top 14 and contains various control selectors (not shown) for selecting operative features of heating elements for cook top 14 and the oven.

Cook top 14 includes four gas fueled burners 10, which are positioned in spaced apart pairs positioned adjacent each side of cook top 14. A recessed area 24 of cook top 14 surrounds each burner 10. Recessed area 24 is positioned below an upper surface 26 of cook top 14 and serves to catch any spills from cooking vessels (not shown in FIG. 1) being used with cook top 14. Each burner assembly 10 extends upwardly through an opening in recessed areas 24, and a grate 28 is positioned over each burner 10. Each grate 28 includes a flat surface thereon for supporting cooking vessels and utensils over burner assemblies 10 for cooking of meal preparations placed therein.

For purposes of describing the invention, four burners 10 as might be used on a kitchen stove appliance are depicted. However, using the teachings disclosed herein, one of skill in the art will understand that the present invention may be used with a different number of burners and different appliances as well. By way of example, the present invention could be used with other types of range appliances, gas ovens, gas powered water heaters, and other appliances that use one or more gas burners. Also, orifices, shutters, and other elements as may be associated with burners 10 are not shown as such will be understood by those of ordinary skill in the art.

Gas fuel is fed to burners 10 by gas distribution system 100, which can utilize gases such as e.g., propane or natural gas. Distribution system 100 is fed in turn by a gas inlet 105 connected to a gas supply. Gas inlet 105 may be, e.g., a port or other connection located on the appliance. Conduit 110 connects gas inlet 105 to a gas manifold 115, which in turn distributes gas over the four control valves 130. In turn, control valves 130 determine the flow to burners 10. Conduit 110 and manifold 115 may be constructed from e.g., piping, tubing, or the like and may be mostly contained within the appliance and, therefore, out of view of the user.

In an exemplary aspect of the present invention, gas distribution system 100 includes a shut-off valve 120 in communication with a control module 125. Shut-off 120 valve is located downstream (subsequent or after in the direction of gas flow) of gas inlet 105 and preferably as close as possible to inlet 105 (in terms of the length of the gas travel path) so as to maximize the amount of distribution system 100 that can be isolated when testing for a gas leak. Stated alternatively, shut-off valve 120 is located close to gas inlet 105 to minimize the amount of gas that will be in the appliance between shut-off valve 120 and inlet 105 and thereby enlarge the amount of distribution system 100 that will be subjected to leak detection. Upon receiving an instruction from control module 125, valve 120 can be operated so as to open or close the flow of gas into gas distribution system 100. Valve 120 is operated electronically based on instructions from control module 125. Control module 125 may be e.g., a microprocessor, microcontroller, or other electronic control device.

It should be understood that the dashed lines in FIG. 2 represent elements of this exemplary embodiment that are in communication with each other. By way of example, and as will be understood by one of ordinary skill in the art using the teachings herein, the dashed lines may represent digital or analog signals communicated through e.g., wiring or wireless components.

At the other end of gas distribution system 100, four control valves 130 are each associated with a respective burner 10. More specifically, each control valve 130 is placed upstream of a burner 10 and preferably as close as possible to burner 10 so as to maximize the amount of distribution system 100 that can be isolated when testing for a gas leak. Control valves 130 are in communication with the control module 125 such that control module 125 can detect when such valves 130 are closed.

Numerous connection schemes may be used for valves 130 and control module 125. For example, control valves 130 may contain electrical switches to indicate to the control module 125 that all of valves 130 are closed. For N control valves 130 (e.g., N=4 in FIG. 1), such could be communicated by N number of individual signals, one from each valve 130, to indicate the state of each valve 130 as open or closed. Alternatively, the switches could be connected in a series and closed when valves 130 are in the off position so as to provide a single signal to control module 125 indicating that all valves 130 are closed. In still another exemplary alternative, the switches of valves 130 could be connected in parallel and each opened when a respective valve 130 is in the off position so as to provide a single signal to control module 125 indicating that all valves 130 are closed. Other schemes may be used as well provided control module 125 can determine when all valves 130 are closed.

A gas pressure sensor 135 is positioned in distribution system 100 upstream of control valves 130. The precise location of pressure sensor 135 is not critical provided sensor 135 is positioned so as measure the pressure of gas isolated in the appliance by the closing of control valves 130 and shut-off valve 120. Gas pressure sensor 135 is in communication with control module 125 to provide pressure readings to module 125.

Figure 3:
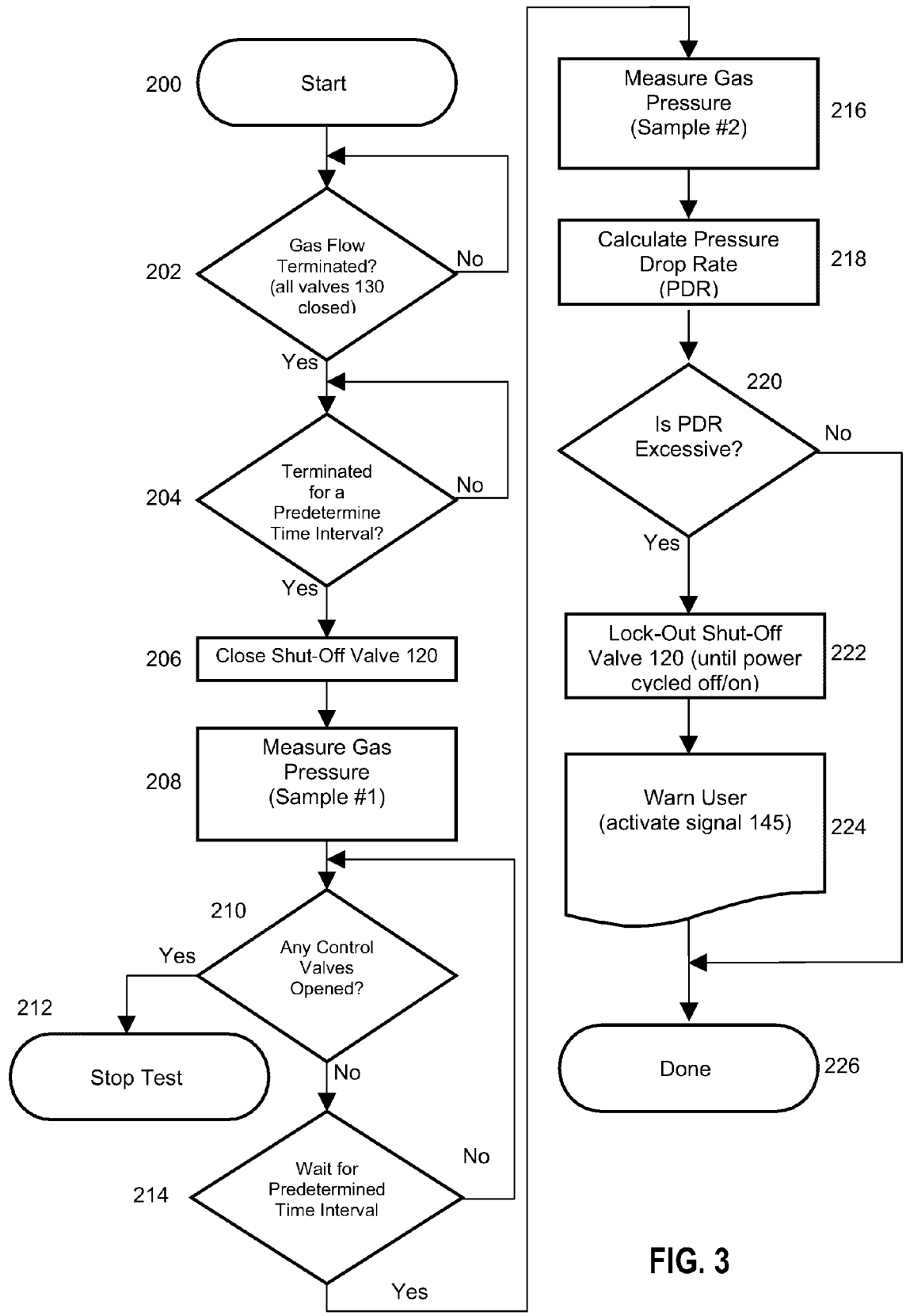
FIG. 3 provides a flow chart of an exemplary method of the present invention.

Referring now to FIGS. 2 and 3, in an exemplary method of operation, control module 125 initiates a gas leak detection routine by determining whether gas flow to burners 10 has been terminated by the closing of all valves 130 as indicated in step 205. For example, a user of the appliance may have turned off gas flow to all burners 105 by manually closing each of valves 130. Control module 125 may be programmed to periodically initiate the detection routine on some predetermined time interval. For example, control module 125 could be programmed to make daily, weekly, or monthly checks for a gas leak in the appliance provided each of valves 130 are closed.

Alternatively, control module 125 could be programmed to initiate a leak detection routine each time all valves 130 have been in a closed position for a predetermined period of time as indicated in step 204. By way of example, the pressure of the gas will be sensitive to temperature changes, and heating of the gas may occur as the appliance 12 is used and its internal components such as e.g., conduit 110 are heated. Accordingly, in one exemplary embodiment of the invention, a predetermined interval of time is allowed after all valves 130 have been closed to ensure that sufficient cooling and temperature stabilization has occurred. As will be further discussed, step 204 is optional as other approaches may be used to address temperature fluctuations as well.

Once control module 125 has determined that all valves 130 are closed, gas flow to the appliance is terminated by closing shut-off valve 120 as shown in step 206. More specifically, control module 125 sends a signal to shut-off valve 120 to close and thereby isolate gas in distribution system 100 between control valves 130 and shut-off valve 120.

With gas now isolated in the appliance, in step 208 the pressure of the isolated gas in distribution system 100 is measured using pressure sensor 135. More specifically, a pressure measurement is preferably taken (sample #1 in FIG. 3) shortly after the gas is isolated by closing valves 130 and shut-off valve 120. Pressure sensor 135 provides the pressure measurement to control module 125. After waiting a predetermined interval of time as in step 214, the pressure is re-measured in step 216 (sample #2 in FIG. 3) by sensor 135 and again reported to control module 125.

In step 218, by calculating the pressure drop rate (PDR) between sample one and sample two, control module 125 ascertains whether the pressure of gas isolated in the distribution system is decreasing by an unacceptable amount. For example, control module 125 determines whether the pressure has decreased by more than a certain amount between the times of the first and second pressure measurements (samples #1 and #2). The amount or percentage deemed unacceptable may range e.g. from zero to some quantity that is considered insignificant.

In addition, control module 125 can be programmed to compare multiple subsequent pressure measurements for comparison. By way of example, control module 125 compares the first measurement of pressure after closing shut-off valve 120 with multiple subsequent pressure measurements for determination of whether a leak has occurred. Other comparison routines may be developed as well using the teachings disclosed herein.

If the PDR is excessive as determined in step 220, then the control module 125 locks out shut-off valve 120 in step 222. The lock out continues until a reset occurs such as a cycling on and off of the power by a qualified technician. In step 224, a warning that uses signal 145 is sent to the user to notify that a shut-off has occurred so that service will be initiated. On the other hand, if the PDR is not excessive, then the control module has completed the cycle as in step 226. It should be understood that the control module 125 can be programmed to return to start 200 and repeat the cycle again multiple times while appliance 12 remains idle.

As shown in FIG. 2, a temperature sensor 140 may also be incorporated into gas distribution system 100. As previously stated, the pressure of gas in distribution system 100 will be directly affected by changes in temperature. For example, a significant decrease in temperature between pressure readings would cause the pressure to drop regardless of whether a gas leakage is occurring. Accordingly, temperature sensor 140 is in communication with control module 125 to provide temperature readings. Several variations of the method of FIG. 3 may be used to address changes in temperature of the gas. For example, as stated, the predetermined time period of step 204 can be of a length that ensures that temperature has stabilized by cooling of the appliance before continuing with step 206.

Figure 4:
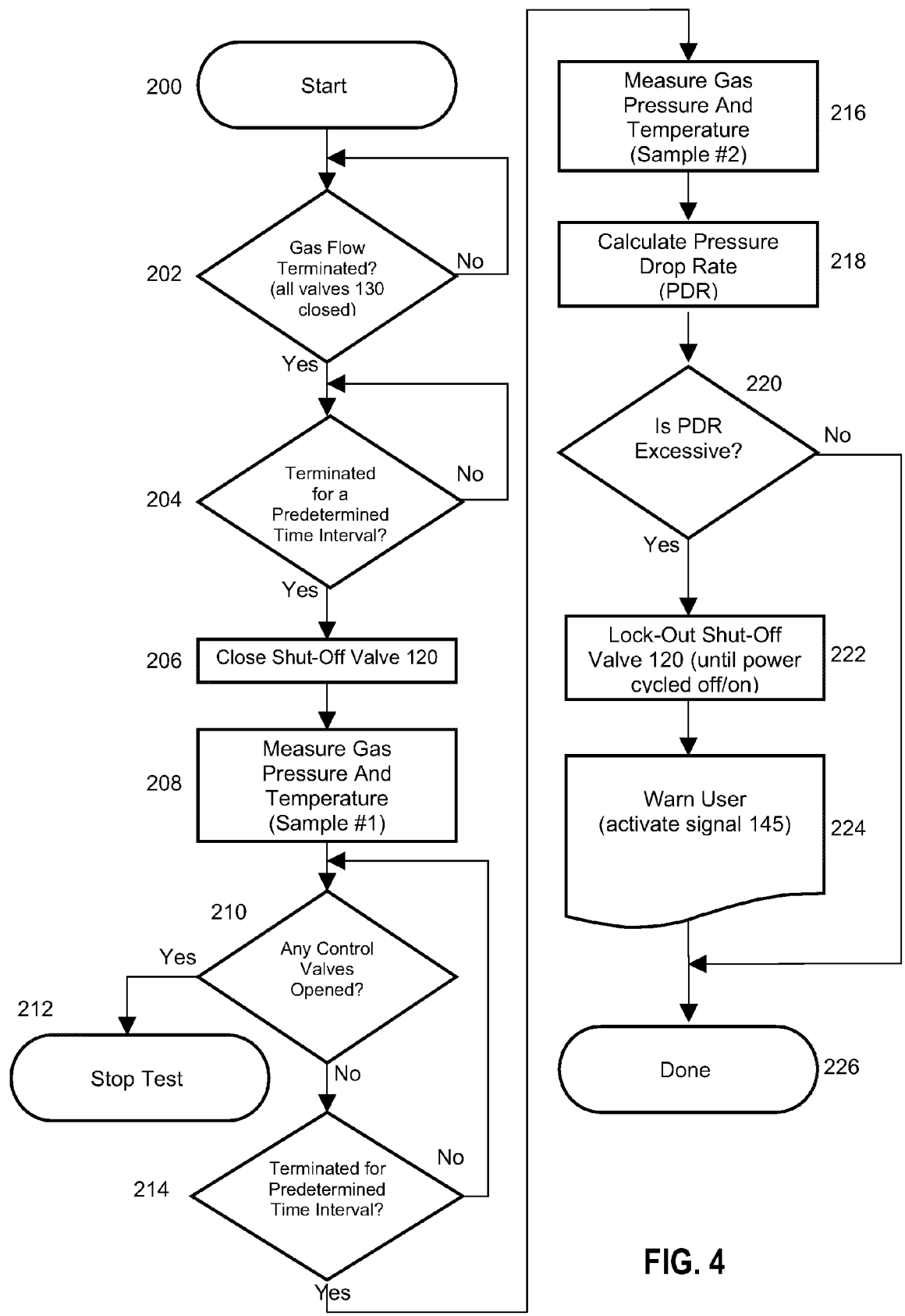
FIG. 4 provides another flow chart of an exemplary method of the present invention.

Alternatively, FIG. 4 provides another exemplary method of the present invention with steps similar to those of FIG. 3. However, in the exemplary method of FIG. 4, both temperature and pressure are measured in step 208 as sample #1. After a predetermined amount of time has elapsed in step 214, both the gas pressure and temperature are measured again in step 216 for sample #2. The control module 125 then uses e.g., the Ideal Gas Law to determine temperature effects on the pressure measurements. As such, control module 125 can be programmed to calibrate for the effect of a temperature change so as to determine whether (or how much of) a reduction in pressure is the result of a temperature change rather than a gas leak. This calibration is then used to calculate whether the PDR is excessive in step 218 as previously set forth be the exemplary method of FIG. 1.

In still another alternative, rather than using the Ideal Gas Law to compensate for temperature changes, control module 125 may also be programmed to ascertain whether the temperature difference between sample 2 and sample 1 differs by more than a predetermined amount such as e.g., 5 percent as would be indicative that fluctuations in temperature are occurring. In such case, rather than making adjustments, control module 125 would continue taking subsequent readings of pressure and temperature between predetermined time intervals until the change in temperature between the last two measurements is zero or less that a certain amount. The control module 125 would then use the last two pressure measurements to determine if an excessive PDR has occurred.

Control module 125 may also be provided with other features. For example, module 125 may also be programmed to re-open shut-off valve 120 in the event a user opens one or more of valves 130. In this way, if the appliance is in the process of determining whether a leak is present and has closed shut-off valve 120, the process can be terminated immediately so as to minimize inconvenience to the user.

In addition, in the above-described exemplary methods, control module 125 initiates a gas leak detection routine using changes in pressure after first determining whether gas flow to burners 10 has been terminated by the closing of all valves 130. In alternative exemplary aspect of the present invention, after determining that all valves 130 have been closed, control module 125 could receive temperature readings from temperature sensor 140 to determine whether temperatures in the appliance have stabilized before using pressure readings of gas from pressure sensor 135 to determine if a leak is occurring. In this way, fluctuations in pressure due to temperature changes can be addressed before pressure readings are taken.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. A gas leak detection system for an appliance, the appliance having a gas inlet and at least one gas burner, the system comprising:

a control valve placed upstream of the gas burner and at a position that minimizes the amount of gas in the appliance between said control valve and the gas burner;

a gas pressure sensor placed upstream of said control valve;

a shut-off valve placed upstream of said gas pressure sensor, downstream of the gas inlet to the appliance, and at a position that minimizes the amount of gas in the appliance between said shut-off valve and the gas inlet;

a signal element for providing a warning regarding a gas leak; and a control module in communication with said control valve, said gas pressure sensor, said shut-off valve, and said signal element, wherein said control module is configured for determining, at a preselected time, whether said control valve is in a closed position and, if so, then closing said shut-off valve and monitoring the gas pressure in the appliance as measured by said gas pressure sensor to determine if an unacceptable decrease in gas pressure has occurred.

2. A gas leak detection system for an appliance as in claim 1, wherein the appliance includes a plurality of gas burners, and wherein said control valve comprises a plurality of control valves with each positioned upstream of a respective gas burner at a position that minimizes the amount of gas in the appliance between said plurality of control valves and their respective gas burners.

3. A gas leak detection system for an appliance as in claim 2, wherein each of said plurality of control valves is configured to provide a signal to said control module so as to indicate the state of each of said plurality of control valves.

4. A gas leak detection system for an appliance as in claim 2, wherein said plurality of control valves are connected in series so as to provide a single signal to said control module to indicate when all of said plurality of control valves are closed.

5. A gas leak detection system for an appliance as in claim 2, wherein said plurality of control valves are connected in parallel so as to provide a single signal to said control module to indicate when all of said plurality of control valves are closed.

6. A gas leak detection system for an appliance as in claim 2, wherein at least one of said control valve, said gas pressure sensor, or said shut-off valve is configured for analog communication with said control module.

7. A gas leak detection system for an appliance as in claim 2, wherein said control module is configured to use said temperature measurements to adjust pressure measurements received from said gas pressure sensor.

8. A gas leak detection system for an appliance as in claim 1, wherein said control module is configured to activate said signal element if the gas pressure in the appliance as measured by said gas pressure sensor is unacceptably decreasing when said shut-off valve and said control valve are both closed.

9. A gas leak detection system for an appliance as in claim 8, wherein said control module is further configured to maintain said shut-off valve in a closed state if the gas pressure in the appliance as measured by said gas pressure sensor is unacceptably decreasing when said shut-off valve and said control valve are both closed.

10. A gas leak detection system for an appliance as in claim 1, further comprising a temperature sensor positioned upstream of said control valve, and wherein said control module is also in communication with said temperature sensor so as to receive temperature measurements from said temperature sensor.

11. A method for detecting a gas leak in an appliance, the appliance having at least one gas burner, comprising the steps of:
   determining whether gas flow to the gas burner has been terminated;
   shutting off the flow of gas to the appliance if gas flow to the gas burner has been terminated;
   measuring the pressure of gas in the appliance after the gas flow to the gas burner has been terminated and at a position upstream from a location in the flow of gas where said step of shutting off occurred;
   re-measuring the pressure of gas in the appliance at a position upstream from the gas burner while the gas flow to the gas burner remains terminated and at an interval of time after said step of measuring;
   ascertaining whether the pressure of gas in the appliance is unacceptably decreasing; and
   providing a notification, available to a user of the appliance, if the pressure of gas in the appliance is unacceptably decreasing.

12. A method for detecting a gas leak in an appliance as in claim 11, further comprising the step of measuring the temperature of gas in the appliance at a position upstream from the gas burner.

13. A method for detecting a gas leak in an appliance as in claim 11, wherein said steps of measuring and re-measuring each further comprises measuring the temperature of the gas in the appliance at a position upstream from the gas burner.

14. A method for detecting a gas leak in an appliance as in claim 13, wherein said ascertaining step further comprises adjusting for changes in temperature over the interval of time between said steps of measuring and re-measuring the pressure.

15. A method for detecting a gas leak in an appliance as in claim 13, wherein said steps of shutting off, measuring, re-measuring, and ascertaining are initiated at a predetermined period of time after said step of determining.

16. A method for detecting a gas leak in an appliance as in claim 11, wherein the appliance includes a plurality of gas burners, and wherein said determining step further comprises determining whether gas flow to each of said gas burners has been terminated.

17. A method for detecting a gas leak in an appliance as in claim 11, further comprising the step of preventing further gas flow into the appliance if the pressure of gas in the appliance is unacceptably decreasing.

18. A method for detecting a gas leak in an appliance as in claim 11, wherein said measuring step occurs immediately after said step of shutting off.

* * * * *